(12) United States Patent
Feng et al.

(10) Patent No.: US 9,747,064 B2
(45) Date of Patent: Aug. 29, 2017

(54) METHOD AND SYSTEM FOR DETERMINING THE TRAY WITH THE BEST PAPER REGISTRATION FOR A PRINT JOB

(71) Applicant: KONICA MINOLTA LABORATORY U.S.A., INC., San Mateo, CA (US)

(72) Inventors: Ann Qiongying Feng, San Jose, CA (US); Kenneth Huang Young, Foster City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/871,512

(22) Filed: Sep. 30, 2015

(65) Prior Publication Data

US 2017/0090835 A1  Mar. 30, 2017

(51) Int. Cl.
G06K 15/00 (2006.01)
G06F 3/12 (2006.01)
H04N 1/00 (2006.01)

(52) U.S. Cl.
CPC .......... *G06F 3/1253* (2013.01); *G06F 3/1296* (2013.01); *G06F 3/1298* (2013.01); *H04N 1/00244* (2013.01); *H04N 1/00519* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2002/0136579 A1* | 9/2002 | Michel | B41J 11/008 400/74 |
| 2005/0105924 A1 | 5/2005 | Suzuki et al. | |
| 2005/0286922 A1 | 12/2005 | Oki | |
| 2006/0164505 A1 | 7/2006 | Maeda | |
| 2006/0262337 A1* | 11/2006 | Kamata | G06F 3/1211 358/1.13 |
| 2007/0017397 A1 | 1/2007 | Kamata et al. | |
| 2007/0041039 A1* | 2/2007 | Doui | G06F 3/1204 358/1.15 |
| 2007/0047022 A1 | 3/2007 | Ikeda | |
| 2007/0065200 A1 | 3/2007 | Asaba | |
| 2007/0071460 A1 | 3/2007 | Chizawa et al. | |
| 2007/0236754 A1 | 10/2007 | Tashiro et al. | |
| 2007/0296752 A1 | 12/2007 | Maruo et al. | |

(Continued)

*Primary Examiner* — Miya J Williams
(74) *Attorney, Agent, or Firm* — Buchanan Ingersoll & Rooney PC

(57) ABSTRACT

A method for controlling at least one printer engine is disclosed, the at least one printer engine having plural trays, and wherein each of the plural trays is aligned independently for imaging on a sheet of print medium. The method includes obtaining information according to first conditions in which each of the plural trays has been aligned; obtaining information according to a second condition in which the at least one printer engine executes a print job; judging differences between each of the first conditions and the second condition; selecting a tray for the print job based on the judged differences; and instructing the print engine to execute the print job using the selected tray.

5 Claims, 6 Drawing Sheets

(56) References Cited

U.S. PATENT DOCUMENTS

| | | | |
|---|---|---|---|
| 2009/0009783 A1* | 1/2009 | Negishi | G03G 15/5095 |
| | | | 358/1.9 |
| 2009/0201525 A1 | 8/2009 | Nakazawa | |
| 2009/0257088 A1 | 10/2009 | Tokashiki | |
| 2009/0316232 A1 | 12/2009 | Ikeda | |
| 2011/0175281 A1 | 7/2011 | Takahashi | |
| 2011/0188080 A1* | 8/2011 | Chigusa | G06F 15/00 |
| | | | 358/1.15 |
| 2011/0210508 A1* | 9/2011 | Nakamura | B41J 13/0036 |
| | | | 271/279 |
| 2011/0234673 A1 | 9/2011 | Ueshima | |
| 2012/0127229 A1 | 5/2012 | Fukasawa et al. | |
| 2012/0141179 A1 | 6/2012 | Atsumi | |
| 2013/0114096 A1 | 5/2013 | Yamashita | |
| 2014/0211226 A1* | 7/2014 | Ishii | G06K 15/4065 |
| | | | 358/1.12 |
| 2016/0011826 A1* | 1/2016 | Nagata | G06F 3/1213 |
| | | | 358/1.15 |

* cited by examiner

310

| Tray # | Paper Size | Date of Calibration | Date of Printer Driver Installation | Date of Engine re-installation | Date/Time when paper last loaded | No of Pages Printed with Current Calibration |
|---|---|---|---|---|---|---|
| 1 | Letter | 11/05/14 | 02/29/12 | 01/02/14 | 9/18/2015 3:45:00 PM | 65,285 |
| | Legal | 01/02/14 | 02/29/12 | 01/02/14 | 9/12/2015 3:40:00 PM | 15,489 |
| | 11x17 | 02/29/12 | 02/29/12 | 01/02/14 | 9/18/2015 2:45:00 PM | 10,263 |
| 2 | Legal | 01/02/14 | 02/29/12 | 01/02/14 | 9/12/2015 3:40:00 PM | 24,879 |
| 3 | Letter | 01/02/14 | 02/29/12 | 01/02/14 | 9/18/2015 3:45:00 PM | 65,285 |
| | Legal | 01/02/14 | 02/29/12 | 01/02/14 | 9/12/2015 3:40:00 PM | 18,259 |
| 4 | 11x17 | 02/29/12 | 02/29/12 | 01/02/14 | 9/18/2015 2:45:00 PM | 10,045 |
| 5 | A4 | 02/29/12 | 02/29/12 | 01/02/14 | 9/16/2015 7:45:00 PM | 2,058 |
| 6 | Letter | 08/15/15 | 02/29/12 | 01/02/14 | 9/18/2015 3:45:00 PM | 95,678 |
| | A4 | 02/29/12 | 02/29/12 | 01/02/14 | 9/16/2015 7:45:00 PM | 1,256 |

Table 1

320

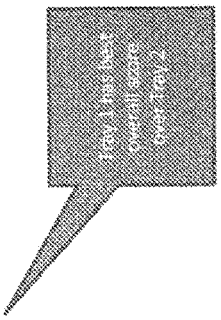

| Item # | Factor | Priority | Weight | Tray 1 Rating | Tray 1 Score | Tray 2 Rating | Tray 2 Score | Tray xxx Rating | Tray xxx Score |
|---|---|---|---|---|---|---|---|---|---|
| 0 | Printer Driver user setting | 7 | N/A | | | | | | |
| 1 | Shortest path of paper tray | 2 | 10% | 2 | 0.4 | 8 | 1.6 | | |
| 2 | Number of pages already printed | 6 | 20% | 5 | 6 | 5 | 6 | | |
| 3 | Last time tray was calibrated | 5 | 25% | 8 | 10 | 6 | 7.5 | | |
| 4 | Paper Size | 4 | 30% | 9 | 10.8 | 8 | 9.6 | | |
| 5 | Tray Alignment after printer driver update | 3 | 5% | 1 | 0.15 | 4 | 0.6 | | |
| 6 | Tray Alignment after engine re-installation | 1 | 10% | 4 | 0.4 | 2 | 0.2 | | |
| 7 | Best | N/A | N/A | | | | | | |
| TOTAL | | | 100% | | 27.75 | | 25.5 | | |

Table 2

FIG. 3

METHOD AND SYSTEM FOR DETERMINING THE TRAY WITH THE BEST PAPER REGISTRATION FOR A PRINT JOB

FIELD OF THE INVENTION

The present invention relates to a method and system for determining the tray with the best paper registration for a print job.

BACKGROUND OF THE INVENTION

In today's multi-function devices, there is an adjustment feature called "tray alignment" or "paper registration" that allows the user to make an adjustment to the image (vertical or horizontal) position in such a way that the image is centered on the page. This feature can be most helpful when printing in duplex because if the front side is not centered (for example, the left margin is wider than the right margin), then the back side will be printed off center, that is, in the opposite direction where the right margin is wider than the left margin. If, for example, the page is not centered, the front and back side of the printed page will not align.

The tray alignment feature seeks to address this issue. However, even if the tray alignment has been performed, several environmental factors can influence the accuracy of the alignment adjustment.

SUMMARY OF THE INVENTION

In consideration of the above issues, it would be desirable to have a method and system for determining the tray with the best paper registration for a print job.

A method is disclosed for controlling at least one printer engine, the at least one printer engine having plural trays, and wherein each of the plural trays is aligned independently for imaging on a sheet of print medium, the method comprising: obtaining information according to first conditions in which each of the plural trays has been aligned; obtaining information according to a second condition in which the at least one printer engine executes a print job; judging differences between each of the first conditions and the second condition; selecting a tray for the print job based on the judged differences; and instructing the printer engine to execute the print job using the selected tray.

A controller configured to control at least one printer engine is disclosed, the at least one printer engine having plural trays, and wherein each of the plural trays is aligned independently for imaging on a sheet of print medium, and wherein the controller is configured to: obtain information according to first conditions in which each of the plural trays has been aligned; obtain information according to a second condition in which the at least one printer engine executes a print job; judge differences between each of the first conditions and the second condition; select a tray for the print job based on the judged differences; and instruct the at least one printer engine to execute the print job using the selected tray.

A non-transitory computer readable recording medium stored with a computer readable program code for controlling at least one printer engine, the at least one printer engine having plural trays, and wherein each of the plural trays is aligned independently for imaging on a sheet of print medium is disclosed, the computer readable program code configured to execute a process comprising: obtaining information according to first conditions in which each of the plural trays has been aligned; obtaining information according to a second condition in which the at least one printer engine executes a print job; judging differences between each of the first conditions and the second condition; selecting a tray for the print job based on the judged differences; and instructing the at least one printer engine to execute the print job using the selected tray.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 are illustrations of a pair of tables configured to track and monitor a plurality of trays and tray's characteristics or configuration parameters for each of the plurality of trays.

DETAILED DESCRIPTION

Figure 1:
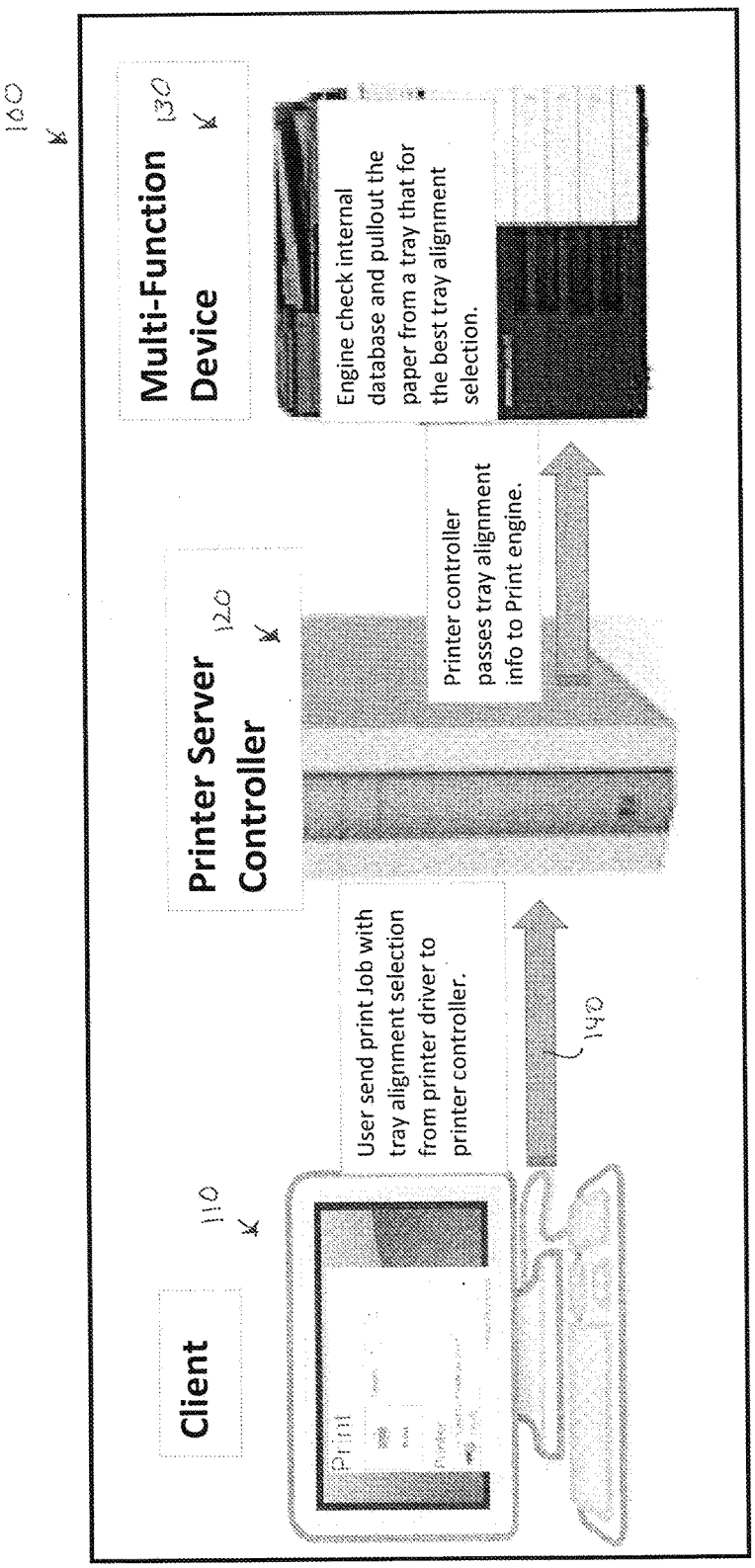
FIG. 1 is an illustration of a system in accordance with an exemplary embodiment, which can include a client device, a printer server controller (or digital front end device), and a multi-function device.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, the methods described herein can be implemented in a system 100 that can include one or more client devices 110, and a digital front end device (or printer controller or printer server controller) 120, and a multi-function device 130, preferably in the form of a multi-function peripheral (MFP) or printer. For example, in accordance with an exemplary embodiment, the multi-function device 130 preferably in the form of multi-function peripheral (or printer) can include a printer controller (or firmware), an image processing section (or data dispatcher), a print engine, an input/output (I/O) section, and a scanner. For example, the printer controller can include a central processing unit (CPU), a random access memory (RAM), and a read only memory (ROM).

Examples of multi-function device 130 consistent with exemplary embodiments of the invention include, but are not limited to, a multi-function peripheral (MFP), a laser beam printer (LBP), an LED printer, a multi-function laser beam printer including copy function, or color printer. In accordance with another embodiment, the multi-function device 130 can be configured as a multi-function peripheral (MFP) device or all-in-one (AIO) that includes a printer section for converting print data inputted from outside to image data and forming and printing out the converted image onto a printable media, a scanner section for optically reading a document (for example, an image recognition system), and a facsimile section for facsimile receiving and transmitting image data to and from external apparatuses through public telecommunication lines.

In addition, the multi-function device 130 can include one or more post-processing apparatus or functions, which can include for example, a booklet module, a folding module, a punch module, a stitching or stapling module, and a stacking module. For example, a booklet, such a magazine, can be completed by folding the sheet bundle along the positions at which the stapling has been performed.

For example, in accordance with an exemplary embodiment, the image processing section within the multi-function device 130 can be configured to carry out image processing under the control of the printer server controller, and sends the processed print image data to the print engine. The print engine forms an image on a sheet of print medium (for example, a recording sheet) based on the image data sent from the image processing section. The image processing section also includes a scanner section for optically reading a document, such as an image recognition system. The scanner section receives the image from the scanner and converts the image into a digital image. The print engine forms an image on a recording sheet based on the image data sent from the image processing section. The I/O section performs data transfer with the one or more client devices 110 and the printer server controller 120.

The input/output (I/O) section provides communications between the printer section and the one or more client devices 110 and receives page descriptions (or print data) from the one or more client devices 110 for processing within the multi-function device 130. In accordance with an exemplary embodiment, the operation of printer section commences when it receives a page description from the one or more client devices 110 via I/O section in the form of a print job data stream and/or fax data stream. The page description may be any kind of page description languages (PDLs), such as PostScript® (PS), Printer Control Language (PCL), Portable Document Format (PDF), and/or XML Paper Specification (XPS).

In accordance with an exemplary embodiment, the multi-function device 130 can also include one or more media trays (or trays) to the image processing section for imaging and processing. In addition, the one or more media trays can include an auto feeding mechanism or tray, wherein a user can feed one or more sheets or pages of a printed image, cover sheet of a package of print media and/or other documents to the image processing section for imaging and processing.

In accordance with an exemplary embodiment, the one or more client devices 110 can include a processor, and one or more memories for storing software programs and data (such as files to be printed). In accordance with an exemplary embodiment, the one or more client devices 110 can include a multi-function peripheral, an image forming apparatus, a personal computer, a portable device such as a notebook personal computer, desktop computer, a mainframe, a kiosk, a cable box, a mobile, cellular or smart phone, a personal digital assistant (PDA), a router, an intermediary device and/or server and like devices and/or systems, which send data over a communication network 140.

In accordance with an exemplary embodiment, the system 100 can also include a printer server controller (for example, a digital front end (DFE) device) 120. The printer server controller or digital front end device 120 can be configured to control the one or more multi-function devices within the system 100. For example, the printer server controller or digital front end device 120 can be configured to load files from various network sources and process the files so they can be output on digital equipment, whether it be a small all-in-one or a large multi-functional peripheral or printer. In accordance with an exemplary embodiment, the printer server controller or digital front end device 120 can be configured to accept and process files for variable data applications and to pull information from a database for personalized documents. In addition, the printer server controller or DFE 120 can be networked to the plurality of multi-functions devices 100 via a network connection 140, or can be connected to the multi-function device 130 via a video connection.

In accordance with an exemplary embodiment, the one or more client devices 110, the printer server controller or digital front end device 120, and the multi-function device 130 can be connected to one another via a communication network (not shown). For example, the communication network can be a public telecommunication line and/or a network (for example, LAN or WAN). Examples of the communication network can include any telecommunication line and/or network consistent with embodiments of the disclosure including, but are not limited to, telecommunication or telephone lines, the Internet, an intranet, a local area network (LAN), a wide area network (WAN) and/or a wireless connection using radio frequency (RF) and/or infrared (IR) transmission.

Figure 2:
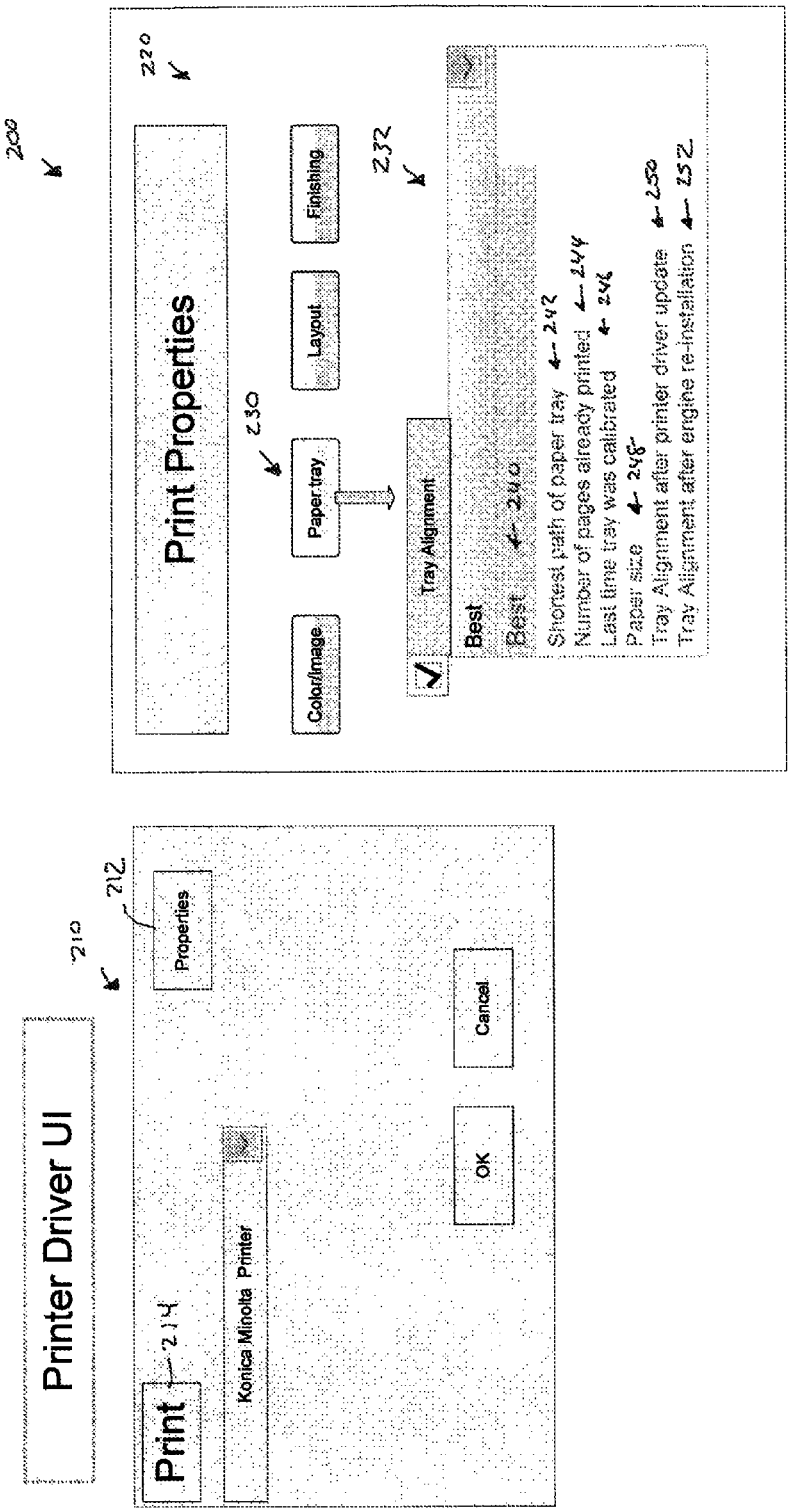
FIG. 2 is an illustration of a printer driver user interface in accordance with an exemplary embodiment.

FIG. 2 is an illustration of a printer driver user interface 200 in accordance with an exemplary embodiment. In accordance with an exemplary embodiment as shown in FIG. 2, a printer driver 210 can reside on the one or more client devices 110. The printer driver 210 can include, for example, a properties box 212, which when checked or clicked, opens a print property graphical user interface 220, which includes a checkbox 230 for "Tray Alignment." In accordance with an exemplary embodiment, for example, when a user selects the tray alignment checkbox 230, a pull-down menu 232 can be enabled that allows a user to select different options of the tray alignment command. In accordance with an exemplary embodiment, for example, the different options of the tray alignment command can include "Best" 240, "Shortest path of paper tray" 242, "Number of pages already printed" 244, Last time tray was calibrated" 246, "Paper size" 248, "Tray alignment after printer driver update" 250, and "Tray alignment after engine re-installation" 252.

In accordance with an exemplary embodiment, once the checkbox 230 for "Tray Alignment" has been selected and the "Print" button 214 is clicked on the printer driver 210, the printer driver 210 will create and send a PDL job with the accompanying tray alignment command options to the printer server controller 120. In accordance with an exemplary embodiment, a PDL job could be, for example, a Postscript file or any other print description language.

In accordance with an exemplary embodiment, the printer server controller 120 will interpret the PDL job and RIP the job to generate the bitmaps that will be sent to the printer controller within the multi-function device 130 for printing. In some systems, the printer driver can perform the RIPping and it will send the RIPped job to the printer server controller 120. In addition to the RIPping, the printer server controller 120 will also send to the printer controller the tray alignment commands that were sent to the printer server controller 120 by the printer driver 210.

Upon receiving the bitmap images and prior to the printing of the page, the printer controller within the multi-function device 130 will process the tray alignment commands to determine which of the plurality of trays will be used to print the job.

In accordance with an exemplary embodiment, the selection of the checkbox 230 for "Tray Alignment" for printing of the print job can depend on many factors such as, for example, the availability of each of the pluralities of tray. Some of those factors considered by the printer controller, can include, for example, (1) is the tray out of paper?; (2) is the tray jammed?; and/or (3) does the tray have the correct paper size and media type as requested by the job? Examples of media type can include thick paper, thin paper, transparency, labels, postcards, envelopes, etc.

In accordance with an exemplary embodiment, tray alignment can be factored into the algorithm in making the final decision on which feed tray to use. Throughout the rest of this document, the term "Alignment," "Tray Alignment" or "Calibration" can be used interchangeably.

In accordance with an exemplary embodiment, for example, as shown in FIG. 3 the printer controller can memorizes one or more tables, which tracks and monitors each of the one or more tray's characteristics or configuration parameters. FIG. 3 are illustrations of a pair of tables (Tables 1 and 2) 310, 320 configured to track and monitor each tray's characteristics and/or parameters.

In accordance with another exemplary embodiment, the determination of which tray is selected can be determined by a controller within the printer server controller 120, which is then provided to the multi-function device 130.

In accordance with an exemplary embodiment, for example, Table 1 310 can track the tray number, the paper size used to calibrate the tray, date of the last time the tray was calibrated, date of printer driver installation, dated of engine re-installation, date and time when paper was last loaded, and the number of pages printed since the last calibration. In Table 1 310, the table shows that each tray may have been calibrated with multiple paper sizes. As such, Table 1 310 can keep track of which tray was calibrated with which paper size.

In accordance with an exemplary embodiment, Table 2 320 can setup a priority list that the printer server controller will consider in determining which factors or characteristics should have priority over other factors. The priority numbers listed in Table 2 320 is strictly, for example purposes only. For example, in accordance with an exemplary embodiment, the implementer of the printer engine software can determine which factors are the most important as each engine product may have different sets of priority.

In accordance with an exemplary embodiment, the printer driver user settings as illustrated or shown in the checkbox 230 for the user interface 220, can be stored for example, in the memory of the printer server controller 120. In accordance with an exemplary embodiment, the tray alignment can be selected by the user by selecting the preferred configuration parameter, or alternatively, a "Best" setting can be selected. In accordance with an exemplary embodiment, any one of the configuration settings can be set as a default setting, for example, by an administrator. An explanation of each factor or configuration parameter is as follows:

"Shortest path of paper tray" refers to the physical location of the tray closest to the print process (where toner is laid on paper in the printing process)

"Number of pages already printed" refers to the number of pages that were fed from the Tray since its last calibration.

"Last time tray was calibrated" refers to the date the tray was calibrated

"Paper size" refers to the paper sizes that were used to calibrate the trays

"Tray Alignment after printer driver update" refers to the date when the printer driver is installed. In some implementation, when a new printer driver version is installed, it could require performing tray calibration again because driver settings may change the tray alignment settings that were previously performed by the older printer driver.

"Tray Alignment after engine re-installation" refers to the date when the engine was physically moved and re-installed. In some implementation, when an engine is de-installed, moved to another location, and re-installed again, the physical movement of the engine may cause the tray alignment to go out of alignment. Thus, tray alignment settings performed before the re-installation may not be accurate.

"Date/Time when paper last loaded" refers to the date and time in which paper was last loaded into the tray.

"Best" refers to the printer server controller determining the best tray used based on the weighted average of all factors to consider. In Table 2 320, you can find this to be from Item #1 to Item #6. The tray with the best score based on all factors combined will be used as the tray to feed.

In accordance with an exemplary embodiment, in order to interpret the tables, for example, for a print job requesting letter size paper, the user selects Tray Alignment checkbox 230 on the printer driver 210 and selects "Size" in the pull down menu.

In accordance with an exemplary embodiment, for example, the print engine of the multi-function device 130 has Tray 1 (Letter), Tray 2 (Legal), Tray 3 (Letter), Tray 4 (11×17), Tray 5 (A4), Tray 6 (Letter)

When a print job is sent to the printer server controller, the printer controller refers to Table 2 320 to determine the priority factors. The printer controller finds that the highest priority, for example, #7, Printer Driver user setting is the first factor to consider. In the example, it is shown that "Size" was selected by the user at user setting. Since the job calls for letter size, the printer controller first checks which trays were calibrated with letter size paper. In Table 1 310, Tray 1, Tray 3, and Tray 6 are identified as having letter size paper. Based on Priority 7, this effectively eliminates Trays 2, 4 and 5.

Next, the printer controller checks the next priority in Table 2 320 and finds that the "Number of pages already printed" can be found to have the next highest priority. Therefore, the printer controller will check the "Number of pages already printed" of Tray 1, Tray 3, and Tray 6, and the tray with the least amount of pages printed will be the most ideal or preferred tray. For example, in this case, Tray 1 and Tray 3 can be determined to be the best, or more preferred, thus eliminating Tray 6.

Next, the printer controller checks the next priority in Table 2 and finds that the next factor to consider is priority 5, "last time tray was calibrated". In accordance with an exemplary embodiment, based on this priority, the system can identify that tray 6 is the best choice since tray 6 has the most recent date of calibration.

In accordance with an exemplary embodiment, for example, the tray with the shortest path may be given as the highest priority. In this case, if the tray with the shortest path is selected, Tray 1 is the better choice because it is closest to the printing process. Thus, the printer controller chooses Tray 1 to feed paper from the job. The above example is a very simple case to explain the algorithm used by the engine.

However, the examples are not intended to propose or suggest the priority of each factor.

In accordance with an exemplary embodiment, for example, if the "Best" option is selected, the printer controller will determine the best tray to use based on weighted average of all factors found in Table 2 320. For example, in Table 2 320, it is shown that Tray 1 has the best overall score based on the weighted average of all factors. This is taken my multiplying the Priority*Weight*Rating to produce the overall score for Tray 1. Similar calculation is done for Tray 2, Tray 3 . . . . In accordance with an exemplary embodiment, for example, the tray with the highest score can be chosen.

Figure 4A:
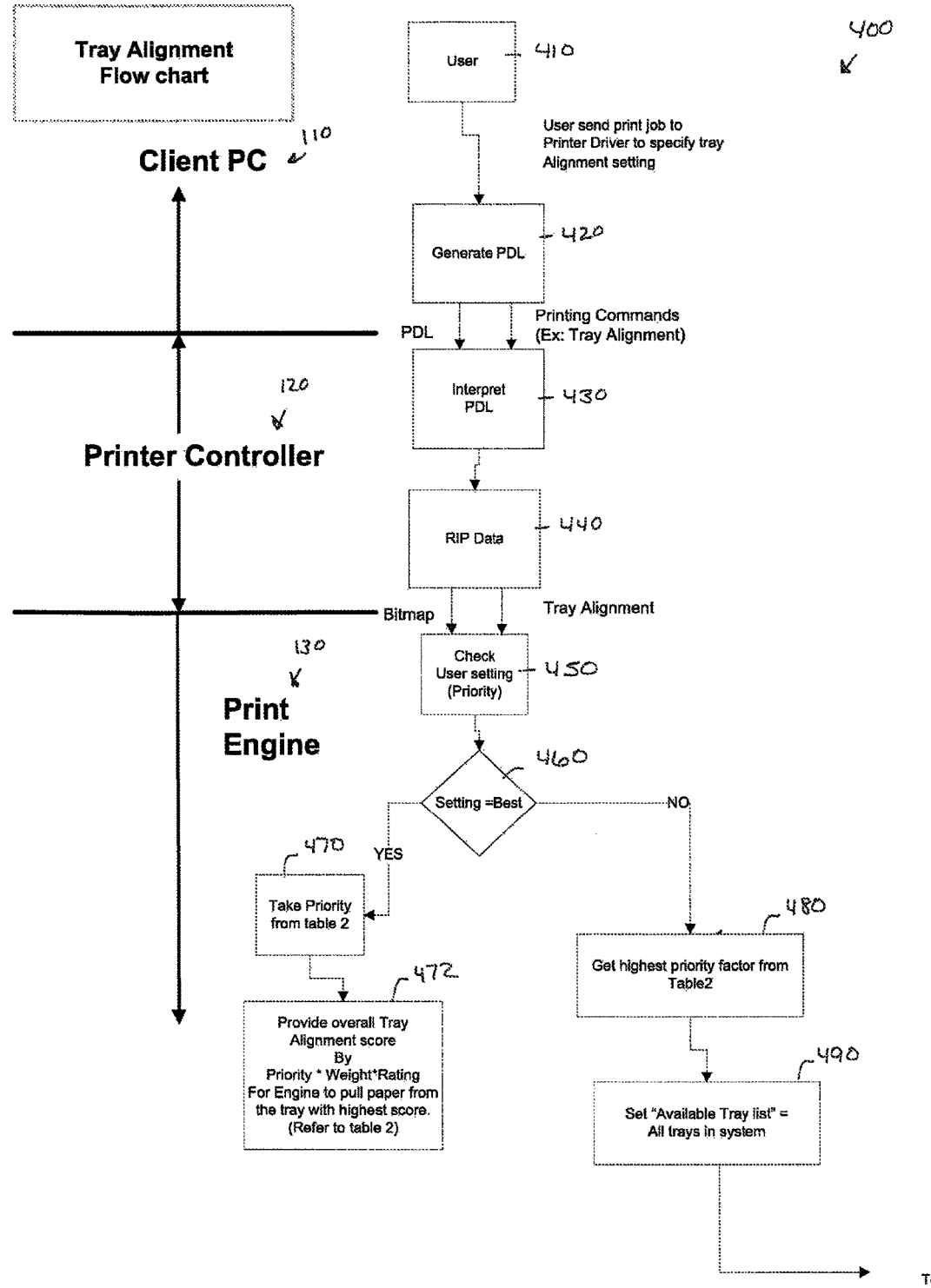
FIGS. 4A and 4B is a flow chart showing an exemplary embodiment of a method and system for determining the tray with the best paper registration for a print job in accordance with an exemplary embodiment.
Figure 4B:
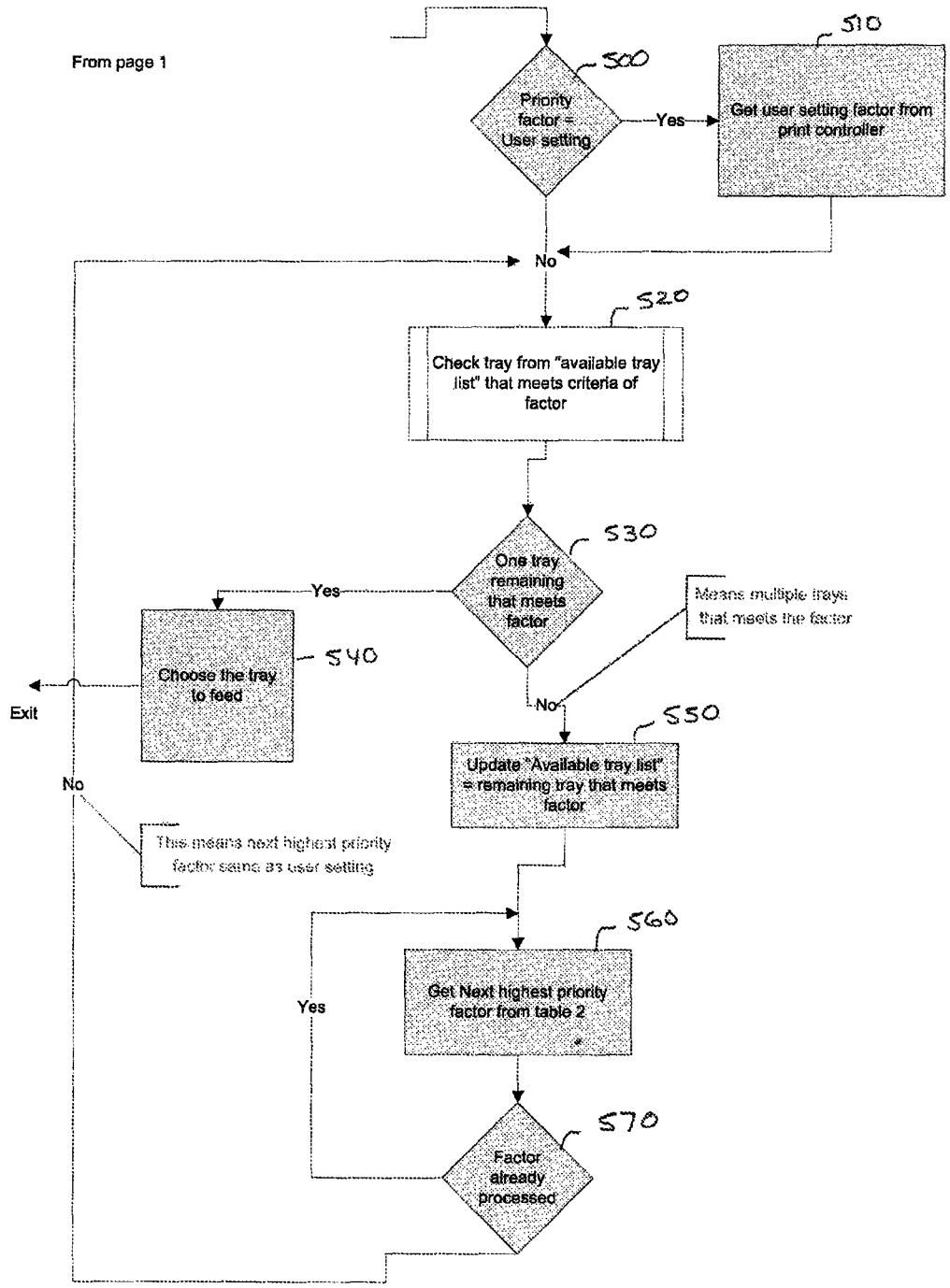

FIGS. 4A and 4B is a flow chart 400 showing an exemplary embodiment of a method and system for determining the tray with the best paper registration for a print job in accordance with an exemplary embodiment. As shown in FIGS. 4A and 4B, in step 410, on the client device 110, the user sends a print job to the printer driver specifying a tray alignment command or setting. In step 420, the print driver generates the PDL, which is sent to the printer server controller 120 with printing commands, which can include, for example, Tray Alignment. In step 430, the printer server controller 120 will interpret the PDL job and RIP (raster image processing) the job to generate the bitmaps that will be sent to the printer controller within the multi-function device 130 for printing. In some systems, for example, the printer driver can perform the RIPping and it will send the RIPped job to the printer server controller 120. In addition to the RIPping, the printer server controller 120 will also send to the printer controller the tray alignment commands that were sent from the client device to the printer server controller 120 by the printer driver 210.

In step 450, upon receiving the bitmap images and prior to the printing of the page, the printer controller within the multi-function device 130 will process the tray alignment commands to determine which tray will be used to print the job by checking the user settings (or priority). In step 460, the printer controller will determine if the user setting is "Best." If the user setting is "Best," in step 470, the printer controller will determine priority, for example, from Table 2 320 as shown in FIG. 3. For example, in step 472, the priority can be provided by "Provide overall Tray Alignment score by Priority "Weight" rating for printer controller to pull paper from the tray with the highest score. (See Table 2 of FIG. 3).

If the user setting is not "Best," the process continues to step 480, wherein the printer controller will get the highest priority factor from Table 2 320. In step 490, the printer controller will set "Available Tray List" equal to all trays in system. In step 500, if the priority factor setting is equal to the user setting, the process continues to step 510, where the p printer controller obtains the user setting factor from the printer server controller 120.

In accordance with an exemplary embodiment, if the priority factor is not equal to the user setting, the process continues to step 520 (FIG. 5), where a check tray process is performed from the "available tray list" that meets the configuration parameters (or criteria of factor). In step 530, a determination is made if a remaining tray meets the configuration parameter or factor. If the one remaining tray meets the configuration parameter or factor, the process continues to step 540, where the tray is chosen to feed the media to the print engine and the process ends.

Alternatively, if multiple trays meet the configuration parameters or factors, the process continues to step 550, where the "Available tray list" is updated to equal remaining trays that meet configuration parameter or factor. In step 560, the next highest priority factor from table 2 is selected. In step 570, if the factor already processed, the process returns to step 560. If the factor is not already processed, the process continues to step 520.

Figure 5:
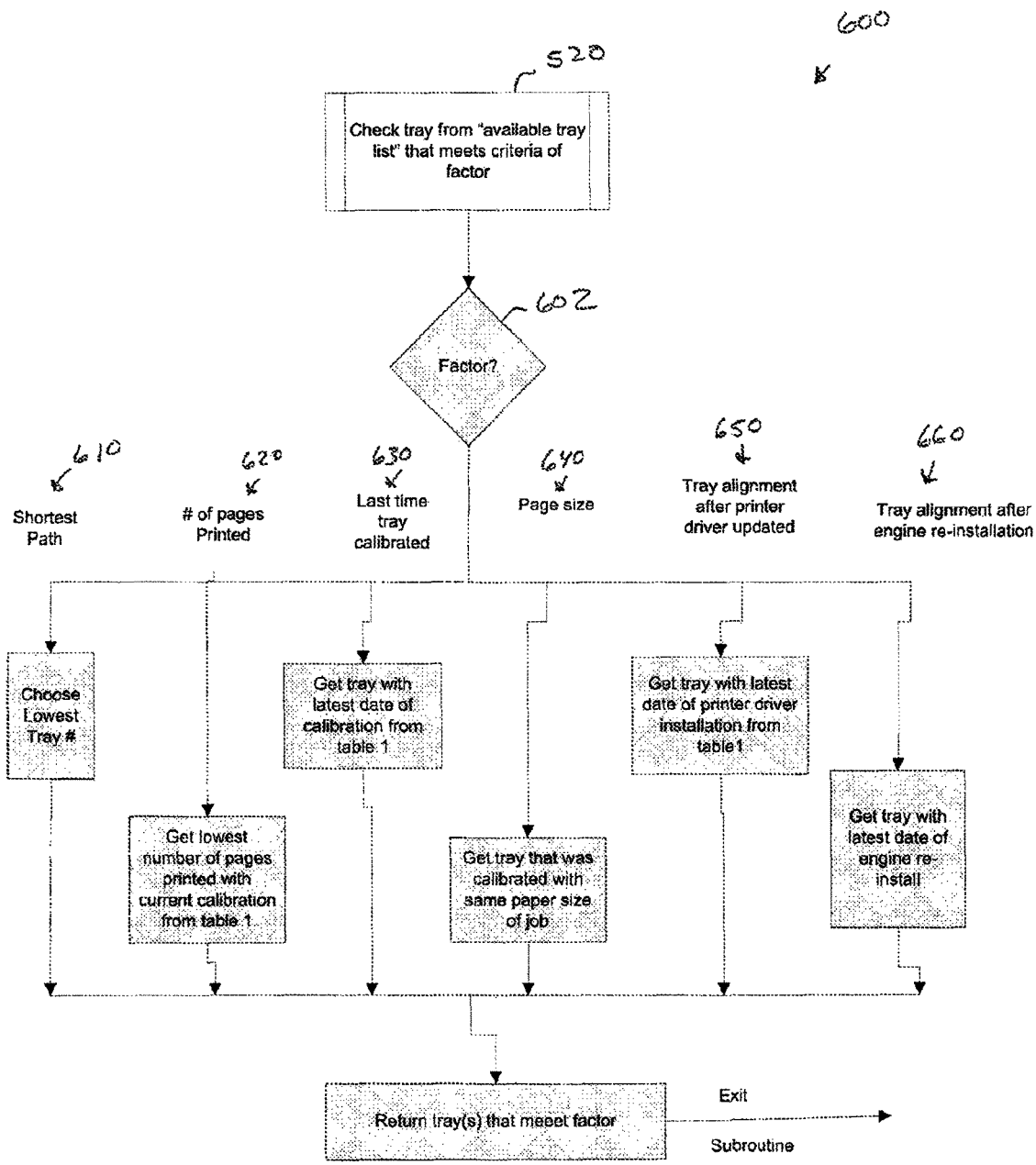
FIG. 5 is a flow chart showing an exemplary embodiment for checking a tray from a list of available trays that meet criteria of factor in accordance with an exemplary embodiment.

FIG. 5 is a flow chart 600 showing an exemplary embodiment for selecting a tray from a list of available trays that meet the configuration parameters or criteria factors in accordance with an exemplary embodiment. As shown in FIG. 5, in step 602, the configuration parameter or factor is determined, which can include shortest path 610, number of pages printed 620, last time tray calibrated 630, page size 640, tray alignment after printer driver update 650, and tray alignment after re-installation 660.

In accordance with an exemplary embodiment, for example, the tray selection process can include the shortest path 610, which can be tray with the lowest tray number. The number of pages printed 620 can be the tray with the lowest number of pages printed with current calibration from Table 1 310. The last time tray calibrated 630 can be the tray with latest date of calibration from Table 1 310. The page size 640 can be "Get tray that was calibrated with the same paper size of job." The tray alignment after printer driver update 650 can be the tray with the latest date of printer driver installation from Table 1 310. The tray alignment after re-installation 660 can be the tray with the latest date of engine reinstallation. In accordance with an exemplary embodiment, in step 670, the tray(s) that meet the factor is returned, for example, to the printer server controller 120 for selection of tray for feeding the print media to the print engine.

In accordance with an exemplary embodiment, the method and system as disclosed herein can include a printer server controller (or controller) 120, which can be configured to control at least one printer engine, the at least one printer engine having plural trays, and wherein each of the plural trays is aligned independently for imaging on a sheet of print medium. The controller can be configured, for example, to: obtain (or memorize) information according to first conditions in which each of the plural trays has been aligned; obtain information according to a second condition in which the at least one printer engine executes a print job; judge and/or determine differences between each of the first conditions and the second condition; select a tray for the print job based on the judged differences: and instruct the at least one printer engine to execute the print job using the selected tray.

In accordance with an exemplary embodiment, the controller 120 can be configured to: judge differences between first paper sizes which has been used for each of the alignments of the plural trays and second paper sizes which are used for the print job, and select the tray of which the first paper size is same as the second paper size.

In accordance with an exemplary embodiment, the controller 120 can be configured to: judge differences between first print counts when each of the alignments were performed and a second print count when the print job is executed, and select the tray of which the differences between the first print count and the second print count is minimum. For example, the controller 120 can select the tray, which has the smallest print count between each of the alignments.

In accordance with an exemplary embodiment, the controller 120 can be configured to: judge differences between first times when each of the alignments were performed and a second time when the print job is executed, and select the tray of which the differences between the first time and the second time is minimum.

In accordance with an exemplary embodiment, the controller 120 can be configured to: control the at least one printer engine in response to an instruction sent from a printer driver, judge differences between first versions of the printer drivers when each of the alignments were performed and a second version the printer driver when the print job is instructed, and select the tray of which the first version is same as the second version.

In accordance with an exemplary embodiment, the controller 120 can be configured to: judge differences between first installation environments when each of the alignments were performed and a second environment when the print job is executed, and select the tray of which the first installation environment is same as the second installation environment.

In accordance with an exemplary embodiment, for example, if there are two or more trays of which the first paper size is same as the second paper size, the controller 120 can be configured to select the tray, among the two or more trays, of which a paper path is the shortest.

In accordance with an exemplary embodiment, the controller 120, for example, can be configured to: obtain first conditions corresponding to two or more printer engines; obtain second condition corresponding to the two or more printer engines; and select the tray for the print job among the two or more printer engines.

In accordance with another exemplary embodiment, a non-transitory computer readable recording medium stored with a computer readable program code for controlling at least one printer engine, the at least one printer engine having plural trays, and wherein each of the plural trays is aligned independently for imaging on a sheet of print medium is disclosed, the computer readable program code configured to execute a process comprising: obtaining information according to first conditions in which each of the plural trays has been aligned; obtaining information according to a second condition in which the at least one printer engine executes a print job; judging differences between each of the first conditions and the second condition; selecting a tray for the print job based on the judged differences; and instructing the at least one printer engine to execute the print job using the selected tray.

The computer readable recording medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for controlling at least one printer engine, the at least one printer engine having plural trays, and wherein each of the plural trays is aligned independently for imaging on a sheet of print medium, the method comprising:
    obtaining information according to a plurality of conditions in which each of the plural trays has been aligned, and wherein the alignment of the each of plural trays is an adjustment to a position of a printable area on the sheet of print medium so that the printable area is centered on the sheet of print medium;
    generating a tray alignment score of each of the plural trays based on weights corresponding to each of the plurality of conditions;
    selecting a tray for the print job from the plural trays based on the tray alignment score; and
    instructing the print engine to execute the print job using the selected tray.

2. The method according to claim 1, comprising:
    obtaining the plurality of conditions corresponding to two or more printer engines; and
    selecting the tray for the print job among the two or more printer engines.

3. A controller configured to control at least one printer engine, the at least one printer engine having plural trays, and wherein each of the plural trays is aligned independently for imaging on a sheet of print medium, and wherein the controller is configured to:
    obtain information according to a plurality of conditions in which each of the plural trays has been aligned, and wherein the alignment of the each of plural trays is an adjustment to a position of a printable area on the sheet of print medium so that the printable area is centered on the sheet of print medium;
    generate a tray alignment score for each of the plural trays based on weights corresponding to each of the plurality of conditions;
    select a tray for the print job from the plural trays based on the tray alignment score; and
    instruct the at least one printer engine to execute the print job using the selected tray.

4. The controller according to claim 3, wherein the controller is configured to interpret a PDL job and generate a bitmap.

5. A non-transitory computer readable recording medium stored with a computer readable program code for controlling at least one printer engine, the at least one printer engine having plural trays, and wherein each of the plural trays is aligned independently for imaging on a sheet of print medium, the computer readable program code configured to execute a process comprising:
    obtaining information according to a plurality of conditions in which each of the plural trays has been aligned, and wherein the alignment of the each of plural trays is an adjustment to a position of a printable area on the sheet of print medium so that the printable area is centered on the sheet of print medium;
    generate a tray alignment score for each of the plural trays based on weights corresponding to each of the plurality of conditions;
    selecting a tray for the print job from the plural trays based on the tray alignment score; and
    instructing the at least one printer engine to execute the print job using the selected tray.

* * * * *